US010491839B2

(12) United States Patent
Colonero et al.

(10) Patent No.: US 10,491,839 B2
(45) Date of Patent: Nov. 26, 2019

(54) METHODS AND APPARATUS FOR TRUE HIGH DYNAMIC RANGE (THDR) TIME-DELAY-AND-INTEGRATE (TDI) IMAGING

(71) Applicant: Massachusetts Institute of Technology, Cambridge, MA (US)

(72) Inventors: Curtis B. Colonero, Shrewsbury, MA (US); Michael W. Kelly, North Reading, MA (US); Megan H. Blackwell, Winchester, MA (US); Lauren L. White, Carlisle, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/163,910

(22) Filed: Oct. 18, 2018

(65) Prior Publication Data
US 2019/0124279 A1    Apr. 25, 2019

Related U.S. Application Data

(60) Division of application No. 15/851,611, filed on Dec. 21, 2017, now Pat. No. 10,142,567, which is a
(Continued)

(51) Int. Cl.
*H04N 5/355*  (2011.01)
*H04N 5/232*  (2006.01)
(Continued)

(52) U.S. Cl.
CPC ....... *H04N 5/35554* (2013.01); *H04N 5/2355* (2013.01); *H04N 5/23254* (2013.01);
(Continued)

(58) Field of Classification Search
CPC .... H04N 5/378; H04N 5/37455; H04N 5/355; H04N 5/37206; H04N 5/3743;
(Continued)

(56) References Cited

U.S. PATENT DOCUMENTS 5,665,959 A    9/1997  Fossum et al.
5,986,810 A   11/1999  Webb
(Continued)

OTHER PUBLICATIONS

Notification of Transmittal of the International Search Report and the Written Opinion of the International Searching Authority in related PCT Application No. PCT/US2014/035502 dated Sep. 22, 2014, 9 pages.
(Continued)

*Primary Examiner* — Michael S Osinski
(74) *Attorney, Agent, or Firm* — Smith Baluch LLP

(57) ABSTRACT

In time-delay-and-integrate (TDI) imaging, a charge-couple device (CCD) integrates and transfers charge across its columns. Unfortunately, the limited well depth of the CCD limits the dynamic range of the resulting image. Fortunately, TDI imaging can be implemented with a digital focal plane array (DFPA) that includes a detector, analog-to-digital converter (ADC), and counter in each pixel and transfer circuitry connected adjacent pixels. During each integration period in the TDI scan, each detector in the DFPA generates a photocurrent that the corresponding ADC turns into digital pulses, which the corresponding counter counts. Between integration periods, the DFPA transfers the counts from one column to the next, just like in a TDI CCD. The DFPA also non-destructively transfers some or all of the counts to a separate memory. A processor uses these counts to estimate photon flux and correct any rollovers caused by "saturation" of the counters.

9 Claims, 17 Drawing Sheets

Related U.S. Application Data continuation of application No. 15/331,455, filed on Oct. 21, 2016, now Pat. No. 9,866,770.

(60) Provisional application No. 62/244,440, filed on Oct. 21, 2015.

(51) Int. Cl.
| | | |
|---|---|---|
| *H04N 5/235* | (2006.01) | |
| *H04N 5/372* | (2011.01) | |
| *H04N 5/378* | (2011.01) | |
| *H04N 5/374* | (2011.01) | |

(52) U.S. Cl.
CPC ......... *H04N 5/355* (2013.01); *H04N 5/35572* (2013.01); *H04N 5/378* (2013.01); *H04N 5/3743* (2013.01); *H04N 5/37206* (2013.01); *H04N 5/23267* (2013.01)

(58) Field of Classification Search
CPC ........... H04N 5/23254; H04N 5/23267; H04N 5/2355; H04N 5/3355; H04N 5/35581; H04N 5/35554; H04N 5/372; H04N 5/3745; H04N 5/359; H03M 1/60; H03M 1/12; H03M 1/145; H03M 1/001; H01L 27/14634; H01L 27/14609; G11C 19/00
USPC ...................................................... 250/208.1
See application file for complete search history.

(56) References Cited

U.S. PATENT DOCUMENTS

| | | | |
|---|---|---|---|
| 6,021,172 | A | 2/2000 | Fossum et al. |
| 6,678,039 | B2 | 1/2004 | Charbon |
| 6,782,334 | B1 | 8/2004 | Eller et al. |
| 6,900,746 | B1 | 5/2005 | Lovell |
| 7,142,723 | B2 | 11/2006 | Kang et al. |
| 7,268,814 | B1 * | 9/2007 | Pain ..................... H04N 5/3575 348/294 |
| 7,795,650 | B2 | 9/2010 | Eminoglu et al. |
| 8,081,224 | B2 | 12/2011 | Lin |
| 8,179,296 | B2 | 5/2012 | Kelly et al. |
| 8,399,848 | B2 | 3/2013 | Frach et al. |
| 8,426,797 | B2 | 4/2013 | Aull et al. |
| 8,605,853 | B2 | 12/2013 | Schultz et al. |
| 8,692,176 | B2 | 4/2014 | Kelly et al. |
| 8,780,418 | B1 | 7/2014 | Bluzer et al. |
| 8,780,420 | B1 | 7/2014 | Bluzer et al. |
| 8,836,807 | B2 | 9/2014 | Qin et al. |
| 8,933,832 | B2 | 1/2015 | Kelly et al. |
| 9,159,446 | B2 | 10/2015 | Schultz et al. |
| 9,270,895 | B2 | 2/2016 | Kelly et al. |
| 9,374,540 | B1 | 6/2016 | Sacco et al. |
| 9,385,738 | B2 | 7/2016 | Kelly et al. |
| 9,491,389 | B2 | 11/2016 | Kelly et al. |
| 9,615,038 | B2 | 4/2017 | Kelly et al. |
| 9,712,771 | B2 | 7/2017 | Kelly et al. |
| 9,743,024 | B2 | 8/2017 | Tyrrell et al. |
| 9,768,785 | B2 | 9/2017 | Schultz et al. |
| 9,866,770 | B2 | 1/2018 | Colonero et al. |
| 9,866,780 | B1 | 1/2018 | Kultran |
| 10,142,567 | B2 | 11/2018 | Colonero et al. |
| 2006/0082670 | A1 | 4/2006 | Parks |
| 2006/0131484 | A1 | 6/2006 | Peting |
| 2006/0170790 | A1 | 8/2006 | Turley et al. |
| 2007/0075888 | A1 | 4/2007 | Kelly et al. |
| 2008/0055440 | A1 | 3/2008 | Pertsel et al. |
| 2008/0291296 | A1 | 11/2008 | Oike |
| 2009/0073293 | A1 | 3/2009 | Yaffe et al. |
| 2009/0268192 | A1 * | 10/2009 | Koenck ..................... G01C 3/06 356/3 |
| 2010/0182470 | A1 * | 7/2010 | Sugawa ................. H04N 5/374 348/294 |
| 2010/0226495 | A1 | 9/2010 | Kelly et al. |
| 2010/0277607 | A1 | 11/2010 | Choi et al. |
| 2011/0115793 | A1 | 5/2011 | Grycewicz |
| 2011/0235771 | A1 | 9/2011 | Aull et al. |
| 2012/0081589 | A1 | 4/2012 | Nishihara |
| 2012/0086840 | A1 * | 4/2012 | Xhakoni ............... H04N 5/2353 348/297 |
| 2012/0138774 | A1 | 6/2012 | Kelly et al. |
| 2012/0199749 | A1 * | 8/2012 | Kameshima ............. A61B 6/00 250/370.08 |
| 2012/0261553 | A1 | 10/2012 | Elkind et al. |
| 2012/0262322 | A1 | 10/2012 | Kelly et al. |
| 2012/0327251 | A1 | 12/2012 | Majewicz et al. |
| 2013/0003911 | A1 | 1/2013 | Schultz et al. |
| 2013/0088624 | A1 | 4/2013 | Mo et al. |
| 2013/0119233 | A1 | 5/2013 | Guezzi et al. |
| 2013/0214169 | A1 | 8/2013 | Soh et al. |
| 2013/0229543 | A1 | 9/2013 | Hashimoto et al. |
| 2013/0256542 | A1 | 10/2013 | Soh et al. |
| 2014/0022431 | A1 * | 1/2014 | Chen ................. H01L 27/14643 348/308 |
| 2014/0048683 | A1 | 2/2014 | Soh et al. |
| 2014/0232929 | A1 | 8/2014 | Ichikawa |
| 2014/0267852 | A1 | 9/2014 | Bluzer |
| 2014/0267884 | A1 | 9/2014 | Shen et al. |
| 2015/0036005 | A1 | 2/2015 | Kelly et al. |
| 2015/0116564 | A1 | 4/2015 | Williams |
| 2016/0286151 | A1 | 9/2016 | Lahav et al. |
| 2017/0026603 | A1 | 1/2017 | Kelly et al. |
| 2017/0099422 | A1 | 4/2017 | Goma et al. |
| 2017/0208274 | A1 | 7/2017 | Kelly et al. |
| 2017/0281115 | A1 * | 10/2017 | Julien ..................... A61B 6/145 |
| 2017/0366763 | A1 | 12/2017 | Lin et al. |
| 2018/0035067 | A1 | 2/2018 | Tyrrell et al. |
| 2018/0160068 | A1 | 6/2018 | Kelly et al. |

OTHER PUBLICATIONS

Yadid-Pecht, O. et al., "Wide Intrascene Dynamic Range CMOS APS Using Dual Sampling", IEEE Transactions on Electron Devices, vol. 44, No. 10, Oct. 2007, pp. 1721-1723.

Yang, X. D. et al., "A 640×512 CMOS Image Sensor with Ultrawide Dynamic Range Floating-Point Pixel-Level ADC", IEEE Journal of Solid-State Circuits, vol. 34, No. 12, Dec. 1999, pp. 1821-1833.

\* cited by examiner

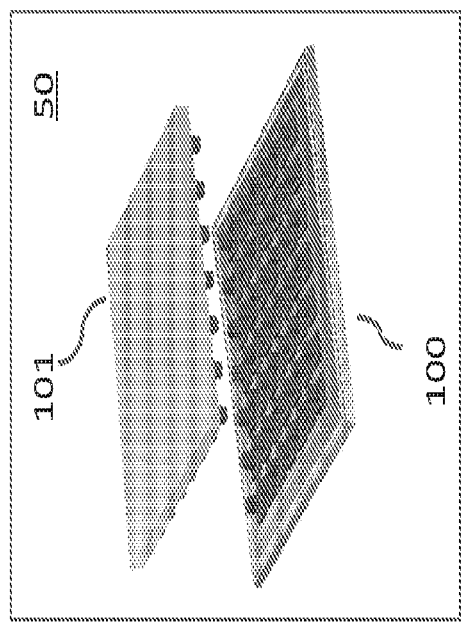

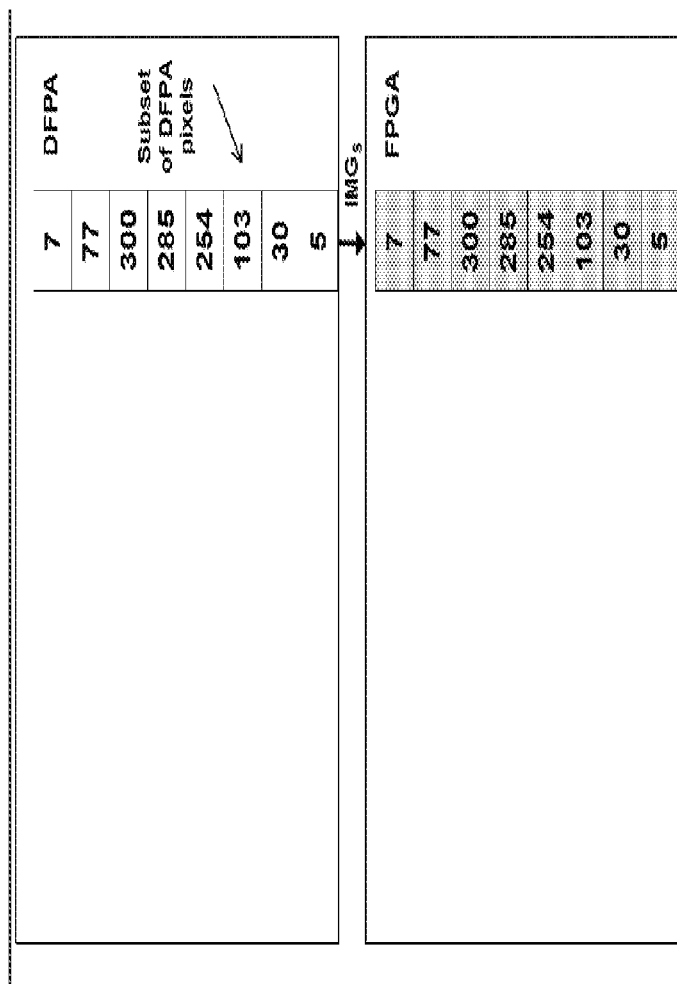

| DFPA | | | | | | | |
|---|---|---|---|---|---|---|---|
| 7 | 77 | 300 | 285 | 254 | 103 | 30 | 5 |
| 7 | 77 | 300 | 285 | 254 | 103 | 30 | 5 |

Subset of DFPA pixels

IMGs

| FPGA | | | | | | | |
|---|---|---|---|---|---|---|---|
| 7 | 77 | 300 | 285 | 254 | 103 | 30 | 5 |

FIG. 4B

| DFPA | | |
|---|---|---|
| 13 | 14 | 7 |
| 154 | 154 | 77 |
| 598 | 600 | 300 |
| 572 | 570 | 285 |
| 509 | 508 | 254 |
| 206 | 206 | 103 |
| 61 | 60 | 30 |
| 10 | 10 | 5 |

Subset of DFPA pixels

IMGs

| FPGA |
|---|
| 7 | 77 | 300 | 285 | 254 | 103 | 30 | 5 |

| | | | | | | DFPA 100 |
|---|---|---|---|---|---|---|
| | | | | | | Subset of DFPA pixels |
| 35 | 28 | 21 | 14 | 7 | | |
| 385 | 308 | 231 | 154 | 77 | | |
| 1500 | 1200 | 900 | 600 | 300 | | |
| 1425 | 1140 | 855 | 570 | 285 | | |
| 1270 | 1016 | 762 | 508 | 254 | | |
| 515 | 412 | 309 | 206 | 103 | | |
| 150 | 120 | 90 | 60 | 30 | | |
| 25 | 20 | 15 | 10 | 5 | | |

↓ $IMG_L$

| 3357 |
|---|
| 36960 |
| 12928 |
| 5728 $N = 480$ |
| 56384 |
| 49440 |
| 14400 |
| 2400 |

↓ $IMG_S$

| | | FPGA 140/150 |
|---|---|---|
| 3357 | | |
| 36960 | | |
| 144000 | | $IMG_{THDR}$ |
| 136800 | | |
| 121920 | | |
| 49440 | | |
| 14400 | | |
| 2400 | | |

For $N = 480$ and $m = 16$

| + | | * | |
|---|---|---|---|
| 0 | | $2^{16}$ | |
| 0 | | $2^{16}$ | |
| 2 | | $2^{16}$ | |
| 2 | | $2^{16}$ | |
| 1 | | $2^{16}$ | |
| 0 | | $2^{16}$ | |
| 0 | | $2^{16}$ | |
| 0 | | $2^{16}$ | |

↑ M

| 3357 |
|---|
| 36960 |
| 12928 |
| 5728 |
| 56384 |
| 49440 |
| 14400 |
| 2400 |

| Viewer | | | | | | |
|---|---|---|---|---|---|---|
| Display  Define Area | | | | | | |
| Mean = 1700614.25   Run Avg 16 Mean = 1869425.75   [455,3254] | | | | | | |
| Std = 5020794.50    Run Avg 16 Std = 5235215.00 | | | | | | |
| 00003D12 | 00004A23 | 00003FBD | 00007768 | 000086A0 | 00FFE2F9 | 0000C0C2 | 00FFFE35 | 00FFFE29 |
| 00003CF  | 00001228 | 00002691 | 00001C6A | 00005608 | 0000B4A9 | 00005ECC | 00FFFA49 | 0000CAB  |
| 00FFEB16 | 0000B024 | 0000CEA7 | 00FFFEE6 | 0000010D | 00007548 | 00001525 | 00003A41 | 000078A1 |
| 00008A93 | 00000962 | 00006FE6 | 0000BE2B | 00007F6E | 0000331D | 0000DB0F | 0000DE15 | 000080DD |
| 00009C2A | 00005208 | 0000030AE| 00005A50 | 000034CF | 0000B350 | 0000DA4  | 00005469 | 00004437 |
| 00FFF28F | 00000F16 | 00000935 | 00005339 | 00FFF760 | 00006FD8 | 00003E82 | 00FFE89F | 00009598 |
| 0000062D | 0000B78B | 0000CA48 | 00009580 | 00FFBE31 | 00FFFD93 | 00FFF922 | 00003587 | 0000BDC1 |
| 00009B00 | 0000B6E0 | 00005B6B | 00006E97 | 00004E0B | 0000C505 | 0000C7A1 | 00003068 | 00007500 |
| 00001D06 | 00003862 | 00001490 | 00FFE7FB | 00002082 | 000056E2 | 00007CAE | 0000073D | 0000E179 |
| 00005D88 | 00FFFF10 | 00000347 | 0000B1A8 | 00FFEE6B | 00001319 | 0000393A | 0000C350 | 0000D273 |
| 00000D28 | 0000DADF8| 0000A483 | 0009ABE  | 0000B32A | 0000B2CF | 00FFE9F7 | 0000685F | 0000B6B  |
| 0000A812 | 0000C6A  | 0000A997 | 0006DAA  | 00002FAE | 000066C2 | 00005533 | 00002284 | 0000225F |
| 0004B0A  | 00002B40 | 00000023F| 00002D1A | 00FFE77C | 00002673 | 000066E5 | 0000905E | 0000C12E |
| 000058B6 | 00FFFED8 | 0000DAEE | 00000AD36| 0000B015 | 00002231 | 00005189 | 00000778C|
| 0000CC9C | 00009FE8 | 00009450 | 00007886 | 00009BA3 | 0000B0C9 | 0000B836 | 00002541 | 0000264D |
| 0000BAD3 | 000043C9 | 000023E0 | 00004000 | 00001F66 | 0000967E | 00006767E| 00000516 | 00008575 |
| 00005A1E | 00002B3C | 00000F10 | 00FFFD04 | 00FFEE37 | 00003970 | 0002558  | 000061F3 | 00000803D|
| 00000F10 | 00000189 | 0000D284 | 0000BE0E | 0000E07A | 0000CA4E | 00001102 | 00000B14 | 00003221 |
| 0000B7B6 | 0000ADEA | 00005B11 | 0000674C | 000062D1 | 0000CAC9 | 0000CC4E | 0000C4D4 | 00FFE2A8 |
| 0000A500 | 00008E42 | 00005015 | 0000A8DF | 0000B5C3 | 00007F95 | 0000875C | 0000A9F6 | 000086FA |
| 00008E08 | 00003CAE | 000032B3 | 00008979 | 00008979 | 00004DC2 | 00006277 | 0000063EB| 00005FD  |
| 00006703 | 00001715 | 00001120 | 00004050 | 00002715 | 00004596 | 0000BC1  | 000022B7 | 00036A8  |
| 00004634 | 00000392 | 00000308 | 00006FA  | 00002481 | 00000BED | 00007EF  | 00000845 |
| 00FFE733 | 00001FA4 | 00FFF7BF | 00FFFA60 | 00FFED40 | 00FFE964 | 00FFF5F3 | 00FFF29A | 00FFF279 |

METHODS AND APPARATUS FOR TRUE HIGH DYNAMIC RANGE (THDR) TIME-DELAY-AND-INTEGRATE (TDI) IMAGING

CROSS-REFERENCE TO RELATED PATENT APPLICATION

This application is a divisional application of U.S. application Ser. No. 15/851,611, filed Dec. 21, 2017, and entitled "Methods and Apparatus for True High Dynamic Range (THDR) Time-Delay-and-Integrate (TDI) Imaging," which is a continuation application of U.S. application Ser. No. 15/331,455, now U.S. Pat. No. 9,866,770, filed Oct. 21, 2016 and entitled "Methods and Apparatus for True High Dynamic Range (THDR) Time-Delay-and-Integrate (TDI) Imaging," which claims the priority benefit, under 35 U.S.C. § 119(e), of U.S. Application No. 62/244,440, filed on Oct. 21, 2015, and entitled "Methods and Apparatus for True High Dynamic Range (THDR) Time-Delay-and-Integrate (TDI) Imaging." Each of these applications is hereby incorporated herein by reference in its entirety.

GOVERNMENT SUPPORT

This invention was made with Government support under Contract No. FA8721-05-C-0002 awarded by U.S. Air Force. The Government has certain rights in the invention.

BACKGROUND

Time-delay-and-integrate (TDI) image scanning is a common method for imaging wide areas or for improving the signal-to-noise ratio (SNR) of a dim scene. TDI dates back to the age of film. It was developed for aerial reconnaissance to solve the problem of image smear and improve the SNR. TDI has also been used for letter and film scanning, aerial reconnaissance, digital radiography, and satellite mapping.

In film-based TDI imaging, film rolls by an open camera shutter at the same relative velocity as the target image to produce a long strip of film of an apparently static scene. Today, most TDI cameras use charge-coupled device (CCD) image sensors instead of film. Instead of rolling film, the registers of the CCD are clocked in synchronization with the object velocity. Put differently, the charge is coupled from row to row in the CCD at a rate that matches the relative velocity of the target image. The charge is integrated as it traverses the CCD to produce a TDI image that may be orders of magnitude brighter than an equivalent static image.

TDI offers several advantages over conventional imaging: (1) it can provide higher SNR; (2) it eliminates the need for a mechanical shutter; (3) it enables long exposure times without introducing smear; and (4) it allows capture of tremendous amounts of high-resolution imagery from a relatively small camera when compared to an equivalent framing camera. For instance, a TDI CCD with 64 rows can collect 64 times as much signal, resulting in an 8-fold increase in SNR.

But CCD-based TDI cameras suffer from drawbacks as well. In particular, a typical CCD has a small charge well depth. This small charge well depth limits the total amount of charge that the CCD can integrate as the charge is transferred across the CCD during the TDI period. As a result, the charge well depth limits the dynamic range of the TDI CCD.

TDI systems can benefit from an extended dynamic range. For example, a TDI system having an extended dynamic range could employ slower scan rates and longer integration times, resulting in greater achievable sensitivity. Alternatively or in addition, digital pixel-based TDI systems having an extended dynamic range could be built that use fewer counter bits to achieve the same dynamic range as regular, non-extended dynamic range systems. This would offer an advantage of using smaller pixels in the extended dynamic range system so that greater resolution imagery could be obtained.

SUMMARY

The inventors previously disclosed a method for extending the dynamic range of digital-pixel focal plane array image sensors using a multi-exposure technique and innovative processing. This application discloses methods and apparatus for achieving true high-dynamic range when imaging in a scanning time-delay-and-integrate (TDI) imaging mode. Using this technique, one can achieve fast, wide-area imaging with high sensitivity and dynamic range. Applications include, for example, wide-area scanning and surveillance, commercial inspection, and medical imaging.

Specific embodiments of the present technology include a method of estimating a total number of detections by a detector element in a detector array comprising at least N detector elements and a counter array comprising at least N m-bit counters. Each detector element in this detector array is operably coupled to a corresponding m-bit counter in the counter array. The method comprises generating, in a first m-bit counter in the counter array, a first count of less than or equal to $2^m-1$. This first count represent detections by a first detector element in the detector array during a first integration period in N integration periods. For n=1 to n=N−1, transfer circuitry in the counter array transfers the $n^{th}$ count from the $n^{th}$ m-bit counter to the $n+1^{th}$ m-bit counter and the $n+1^{th}$ m-bit counter increments the $n^{th}$ count to form an $n+1^{th}$ count in response to detections by the $n+1^{th}$ detector element during an $n+1^{th}$ integration period in the N integration periods. A processor coupled to the counter array estimates a total number of detections by an Nth detector element in the detector array during the N detection periods based at least in part on the first count and the $N^{th}$ count. This $N^{th}$ count may be a residue modulo $2^m$ of the total number of detections.

In some cases, estimating the total number of detections comprises computing a floor of the total number of detections divided by $2^m$. In these cases, estimating the total number of detections can comprise adding the $N^{th}$ count to a product of the floor and $2^m$.

At the end of the first integration period, a processor may non-destructively read the first count from the first m-bit counter to a memory. The processor may also read the $n+1^{th}$ count from the $n+1^{th}$ m-bit counter to the memory for n=1 to n=N−1. In these examples, the processor may estimate the total number of detections is based on the $N-1^{th}$ count.

In some implementations, N is a power of 2 and the processor estimates the total number of detections by multiplying the first count values by N to yield a most significant bit (MSB) value. The processor appends the MSB value to the $N^{th}$ count to yield the total number of detections.

Another embodiment includes a TDI image sensor with a detector array, a counter array operably coupled to the detector array, and a processor operably coupled to the counter array. In operation, the detector array images a scene. The counter array generates images of the scene during a plurality of integration periods. And the processor estimates a total number of detections by a plurality of detector elements (e.g., detector elements in a row or column) in the detector array during the plurality of integration periods based at least in part on two images of the scene.

In some examples of this TDI image sensor, the counter array includes a first m-bit counter operably coupled to a first detector element in the detector array. This first m-bit counter is configured to generate a first count representative of a number of detections by the first detector element during a first integration period, which may be one of the plurality of integration periods. The first integration period may be selected such that the number of detections by the first detector element during the first detection period is less than or equal to $2^m-1$. The first m-bit counter can be configured to shift counts to an adjacent m-bit counter in the counter array, and the adjacent m-bit counter can be configured to increment the counts during another integration period of the plurality of integration periods.

In some instances, the plurality of integration periods includes $2^x$ integration periods, where x is a positive integer, and the counts from the first counter are shifted and incremented $2^x-1$ times. In these instances, the processor is configured to estimate the total number of detections by multiplying the first count by $2^x$ to yield a most significant bit (MSB) value. In these cases, the detector array can comprise $2^x$ detector elements operably coupled to $2^x$ counters in the counter array and the processor can be configured to estimate the total number of detections by appending the MSB value to a value equal to the number of counts in the last counter of the $2^x$ counters after the last of the $2^x$ integration periods. The number of counts in the last counter may be a residue modulo $2^m$ of the total number of detections.

The processor may estimate the total number of detections by computing a floor of the total number of detections divided by $2^m$. In these cases, the processor can be configured to generate the second image by adding the residue modulo m of the total number of detections to a product of the floor and $2^m$.

The TDI image sensor may also include a memory operably coupled to the counter array and the processor. In operation, the memory receives the first count from the first m-bit counter at the end of the first integration period. The memory may also receive a corresponding count from another m-bit counter in the counter array at the end of another integration period in the plurality of integration periods. And memory may receive a corresponding count from another m-bit counter in the counter array at the end of the final integration period in the plurality of integration periods.

Another embodiment includes a TDI image sensor with a detector array, a counter array operably coupled to the detector array, and a processor operably coupled to the counter array. In operation, the detector array images a scene. The counter array generates a first image of the scene during a first integration period and a first TDI image of the scene over a plurality of integration periods. And the processor estimates a total number of detections by a plurality of detector elements in the detector array during the plurality of integration periods based on the first image. The processor also generates a second TDI image of the scene based at least in part on the total number of detections and the first TDI image. This second TDI image has a greater dynamic range the first TDI image.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 1A and 1B show a true high dynamic range (THDR) time-delay-and-integrate (TDI) imaging system.

FIGS. 4A-4E illustrate steps of the TDI THDR process shown in FIG. 3.

FIG. 6B shows hexadecimal counts corresponding to a subset of pixels in FIG. 6A.

FIG. 7B shows hexadecimal counts corresponding to a subset pixels in FIG. 7A.

DETAILED DESCRIPTION

Figure 1B:
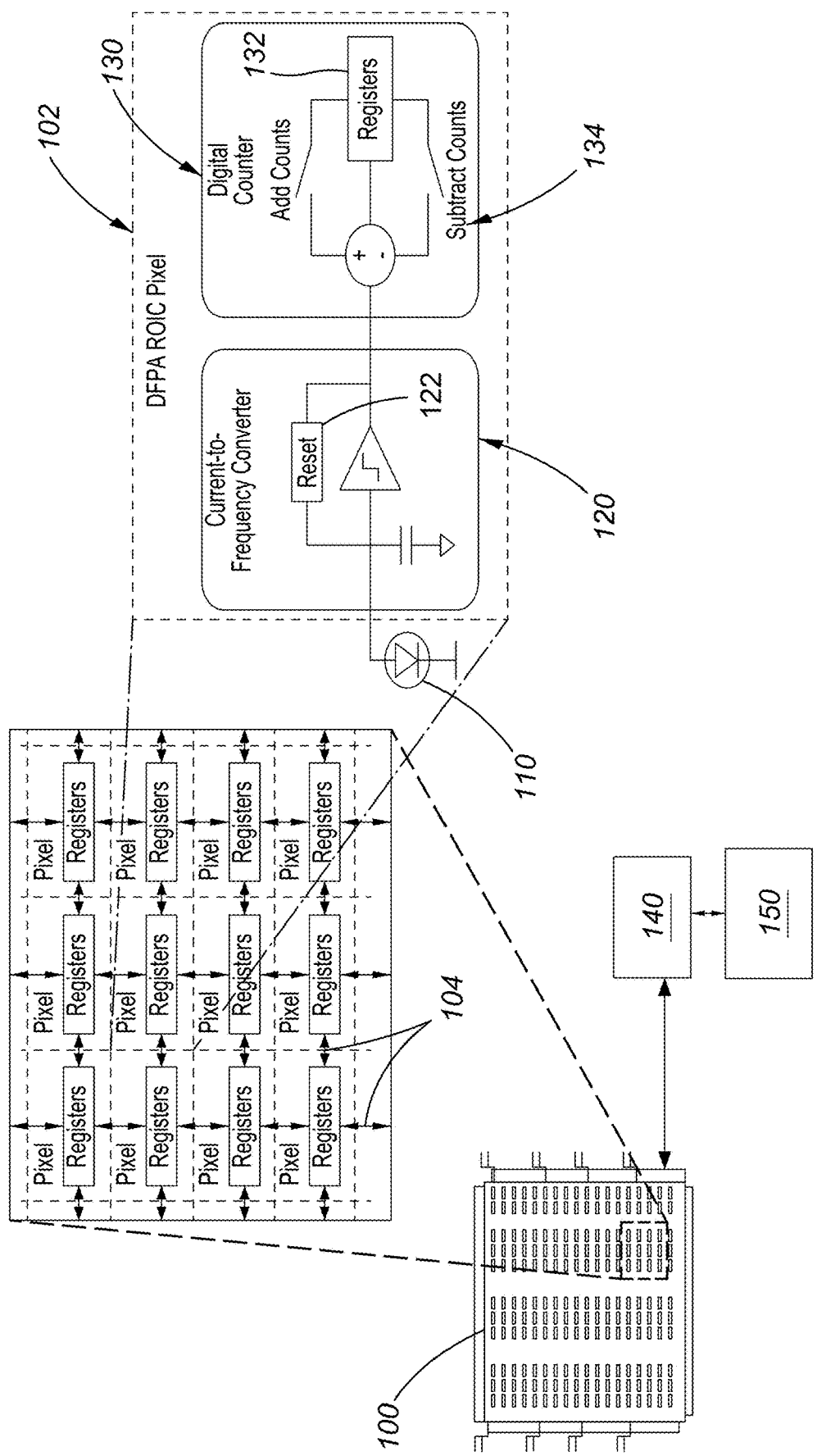

In time-delay-and-integrate (TDI) scanning, the image of a moving object impinges on the focal plane of a camera lens. The scene motion may be due to camera motion, object motion, or mirror scanning. Multiple exposures of the image are collected as the image translates across the focal plane array. Each exposure corresponds to the time it takes for the image to translate on the FPA by a single pixel width. The images from each exposure are aligned and then summed. TDI scanning enables long effective exposure time for moving or scanned scenes. The exposure gain is equal to the number of TDI stages. When using a 2-dimensional format image sensor to perform TDI scanning, the number of columns/rows in the cross-scan direction is typically equal to the number of TDI stages. Large scene areas can be scanned very quickly using TDI scanning. TDI is also used to scan a dim scene to achieve high signal-to-noise ratio (SNR) images.

Most TDI cameras are based on charge-coupled device (CCD) image sensors. When a scene is translated across the CCD image sensor along the direction of charge transfer, TDI scanning can be accomplished. Charge is transferred from pixel to pixel, and charge is accumulated at a rate equal to the image scan rate. While high SNR can be achieved using a CCD image sensor to perform TDI scanning, the dynamic range is typically limited. The dynamic range of a camera system is defined by the difference in brightness between the dimmest and the brightest objects in a scene that produce detectable signal contrast in the recorded image. The intrascene dynamic range refers to objects within a single recorded image. The interscene dynamic range refers to objects within the same scene, but recorded at different times. This disclosure addresses the more stressing intrascene dynamic range. The small charge well depth associated with most TDI-capable image sensors presents a limitation.

A digital focal plane array DFPA includes an analog-to-digital converter in each pixel and each pixel can transfer a stored digital value to any of its four neighboring pixels. This data-transfer operation can be performed in an array-wise fashion so that data in all rows (or columns) is transferred in a single clock cycle. DFPA TDI operation is analogous to the operation of a CCD image sensor, except data transfer is in the digital domain rather than the charge domain. As a result, the data in a DFPA can be read or copied non-destructively, making it possible to transfer each count to multiple registers. (In contrast, because CCDs accumulate charge instead of digital counts, they generally do not support non-destructive readout.) In addition, if the digital counts exceed the counter capacity, the counter would "roll over" to zero and begin counting again. This "roll over" behavior is unlike CCD pixels, which saturate if they exceed their well depth. In some cases, CCD pixels also "bloom," or spill charge into adjacent pixels, further degrading image quality.

The DFPA architecture is very flexible and provides the opportunity to process image data before image readout. One major benefit is the ability to collect and process the data in a way to achieve very high dynamic range, TDI-scanned imagery. In TDI mode, the DFPA transfers and integrates counts, just like a TDI CCD transfers and integrates charge. Unlike a TDI CCD, however, the DFPA also transfers counts from its counters to a separate memory during the TDI scan. This transfer can be a non-destructive transfer. These transferred counts can be used to estimate the photon flux during an integration period, which can be used in turn to estimate the number of times one or more counters has "rolled over" during the multiple integration periods of a TDI scan. Multiplying the estimated number of rollovers by the maximum count achievable by a counter and adding the value of the counter after the last integration period in the TDI scan to the product yields an estimate of the actual counts during the TDI scan. This extends the DFPA's dynamic range beyond past the native bit depth of the DFPA's counters.

Digital Focal Plane Arrays (DFPAs)

FIGS. 1A and 1B show a block diagram of an exemplary DFPA 50 that is configured to generate true high dynamic range (THDR) TDI images. The DFPA 50 includes a digital readout integrated circuit (DROIC) 100 and a detector array 101. The DROIC 100 contains an array of pixels 102, which are connected to each other via control/transfer lines 104. These control/transfer lines 104 can be used to transfer data among the pixels 102 in the array for TDI scanning as well as for filtering, motion compensation, computation, etc.

Each pixel 102 is hybridized or mated to a detector element 110. The detector array 101 is formed of an array of detector elements 110.

Each pixel 102 of the DFPA 50 is mated to a corresponding detector element 110 in the detector array 101 and includes a current-to-frequency (I2F) converter 120 and an m-bit counter 130. The I2F converter 120 contains reset circuitry 122, or other analog-to-digital converter (ADC) circuitry that transforms photocurrent or other analog signals generated by the detector element 110 into digital values that can be used to increment or decrement a digital number stored in the m-bit counter 130. The input of the converter 120 is coupled to the output of the corresponding detector element 110. The output the converter 120 is coupled to up/down switching circuitry 134 inside the counter 130. This up/down switching circuitry 134 is coupled in turn to the input(s) of one or more m-bit registers 132 in the counter 130. These registers 132 stores count values representative of photon detections by the detector element 110. In this case, the up/down switching 134 allows the counter 130 to act as an up/down counter; in other cases, the counter 130 may be a ripple counter, ring counter, modulus counter, cascaded counter, or any other suitable counter.

The DFPA 50 is operably coupled to another processor 140, such as a field-programmable gate array (FPGA) or application-specific integrated circuit (ASIC). The other processor 140 may be bump-bonded to the DROIC 100 chip, fabricated on the same chip as the DROIC 100, or external to the DFPA 50. This other processor 140 may control the reset circuitry 122 in the ADC 120, the up/down switching circuitry 134 in the counter 130, and/or data transfer among pixels on the control/transfer lines 104. The other processor 140 also includes or is coupled to a memory 150, such as FPGA memory, that may store intermediate and final counts acquired by the DFPA 100 during the TDI process. Alternatively or in addition, the memory 150 may be included on the DROIC 100 itself.

In operation, each detector element 110 converts incident photons into photocurrent with a given quantum efficiency. In some cases, the DFPA 100 provides variable amplification for the photocurrent emitted by the detector elements 110. Each detector element 110 couples its output to a corresponding I2F converter 120, which integrates the photocurrent to a predefined threshold charge level. Once the threshold charge level is reached, the capacitor is reset and starts to accumulate charge again. A pulse generator is triggered on every reset and drives the m-bit counter 130 in the pixel 102. The m-bit counter 130 accumulates and stores a count that represents the number of pulses of photocurrent generated by the I2F converter 120 during a particular integration period. When the count exceeds the counter's maximum capacity (i.e., if the count reaches $2^m$), then the counter 130 will roll over and begin counting again at 0.

Typically, the counter 130 rolls over because the number of pulses per detector integration period is greater than $2^m-1$, resulting in a count value equal to the residue modulo $2^m$ of the number of pulses generated by the I2F converter 120 during an integration period. Counter rollover can be promoted, if not guaranteed, by selecting a sufficiently long integration period, by amplifying the photocurrent produced by the detector elements 110, or both. In some cases, the length of the detector integration period and/or the photocurrent gain can be selected by or via the processor as described below.

For more information on DFPAs, see, e.g., U.S. Pat. Nos. 8,179,269, 8,605,853, or 8,692,176, each of which is incorporated herein by reference in its entirety.

On-Chip and Off-Chip Memory

During a TDI scan, data from any one of the TDI stages may be stored in memory located on chip or off chip. In one implementation, illustrated in FIG. 1C, DROIC 100a stores values acquired by a column of pixels 102 in on-chip memory 161a and on-chip memory 161b. Data collected by pixels 102 may be shifted from the first column to the Nth column or vice versa. Data from any column may be stored (not just the first or Nth column) in the on-chip memory 161a/161b.

Figure 1C:
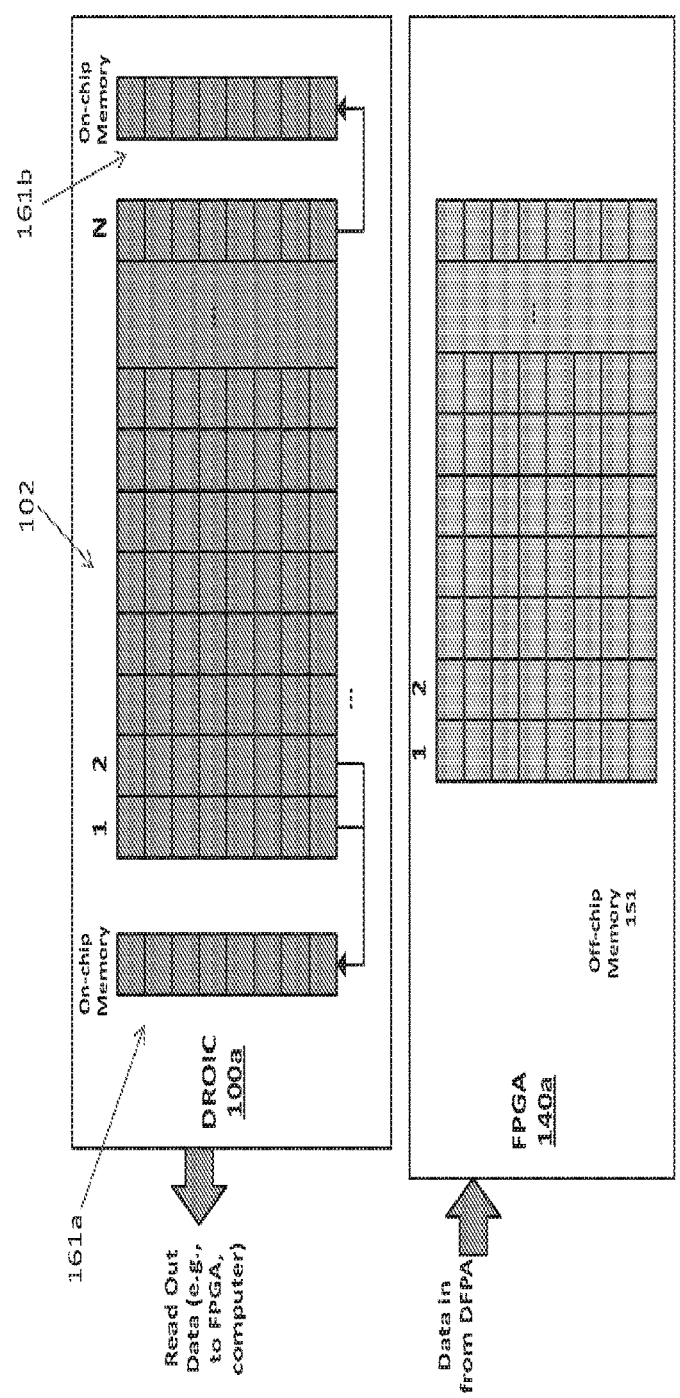
FIG. 1C shows a THDR TDI imaging system with on-chip column buffers and off-chip memory.

In another implementation, also illustrated in FIG. 1C, data from the DROIC 100a is stored in off-chip memory 151 located in FPGA 140a. Data can be stored in off-chip memory 151 that corresponds to multiple "first" integration periods. Each "first" integration period corresponds to a unique column (or row) of a TDI image. For example, after the first integration period, data from column 1 of pixels 102 on DROIC 100a is transferred to column 1 of the off-chip memory 151 in FPGA 140a. Data from column 1 of pixels 102 is also be transferred to column 2 of pixels 102. During a second integration period, the counts shifted to column 2 are used as a starting value and additional counts are accumulated corresponding to the same scene that was imaged during the first integration period. However, now the scene that was imaged during the first integration period has shifted on the array by one column. After the second integration period, data from column 1 of pixels 102 on DROIC 100a corresponds to a different part of the scene than was imaged by column 1 during the first integration period. These values in column 1 after the second integration period are transferred to column 2 of the off-chip memory 151 in FPGA 140a. Stored data or counts can be combined with data from multiple integration periods, as described below.

Figure 1D:
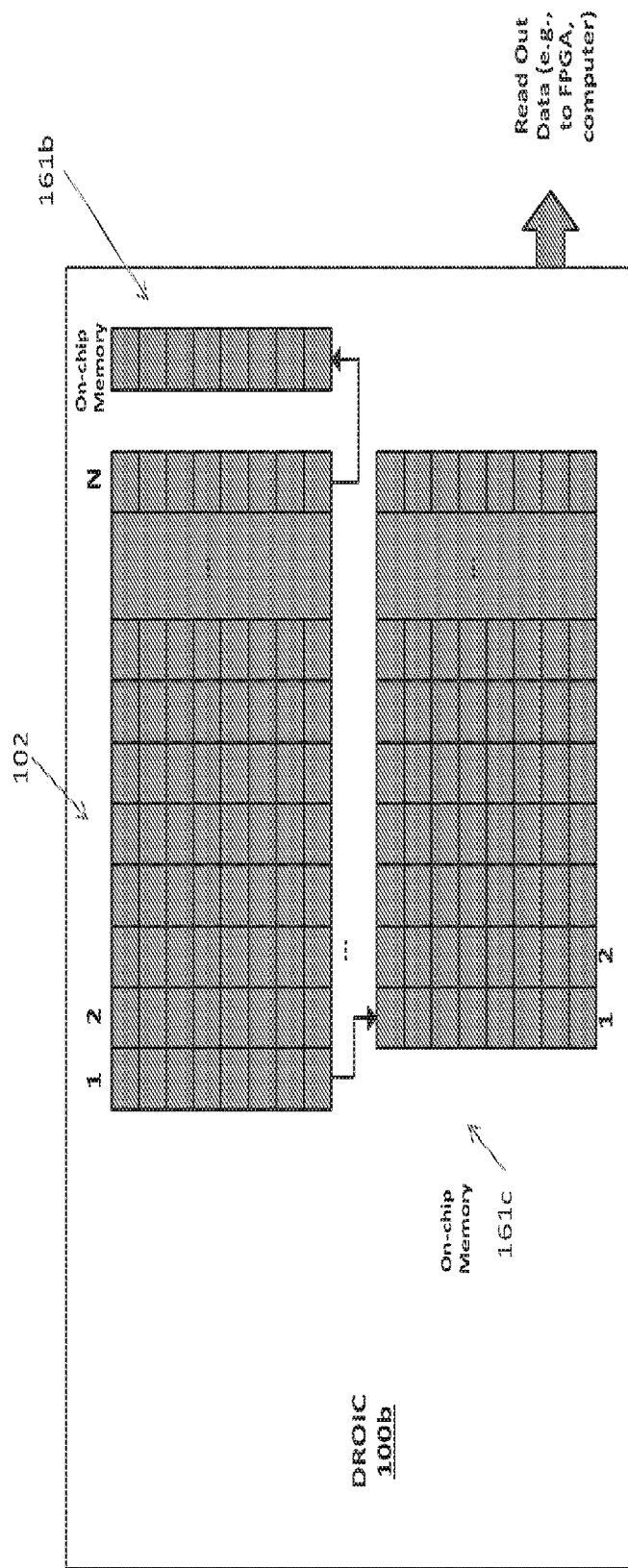
FIG. 1D shows a THDR TDI imaging system with on-chip column buffers and on-chip memory.

In another implementation, illustrated in FIG. 1D, DROIC 100b stores values from multiple first integration periods in on-chip memory 161c. In this example, after the first integration period, data from column 1 of pixels 102 in DROIC 100b is transferred to column 1 of the on-chip memory 161c in DROIC 100b. Data from column 1 of pixels 102 is also transferred to column 2 of pixels 102. After the second integration period, data from column 1 of pixels 102 in DROIC 100b is transferred to column 2 of the on-chip memory 161c in DROIC 100b. Stored data or counts can be combined with data from multiple integration periods, as described below.

Counting with DFPAs

As explained above, a DFPA contains an ADC, such as an I2F converter, and a binary counter, such as a ripple counter, in every pixel. The ADC produces a digital pulse train whose rate is proportional to a photocurrent or other analog signal from a corresponding detector current. The photocurrent is integrated to a predefined threshold. Once the threshold is reached, the capacitor is reset and starts to accumulate charge again. A pulse generator is triggered on every reset and drives the m-bit counter. The least significant bit (LSB) of the ADC is defined by the analog signal amplitude that corresponds to a single digital pulse in the digital signal. Each digital pulse from the pulse generator increments or decrements the counter by one, depending on the count direction.

The counter stores the number of times the threshold was reached. Each counter can count up to $2^m-1$, where m is the size of the counter in bits. (For an I2F converter, the count represents the total number of integrated electrons, which is equal to the count value multiplied by the LSB size.) Following the $(2^m-1)$ count value, the ripple counter resets to 0 on the next pulse from the ADC. Subsequent triggers cause the counter to count until the $(2^m-1)$ count value is reached again and the counter "rolls-over" once again.

Mathematically, the counters perform the modulus operation:

$$DN = \mathrm{mod}(N_{triggers}, 2^m),$$

where DN is the digital number contained within the counter at the conclusion of an integration period and $N_{triggers}$ is the total number of times the counter was triggered during the same integration period. Two possible cases exist following integration:

when $DN < 2^m-1$, $DN = N_{triggers}$; and when $DN > 2^m-1$, $DN = \mathrm{REM}(N_{triggers}/2^m)$, rounded to the lowest integer.

REM indicates the remainder from the division calculation. The modulo property of the counters enables high dynamic range imaging.

DFPAs for True High Dynamic Range (THDR) Imaging

THDR imaging—imaging signals spanning a very large dynamic range with no information gaps in the transfer function—is possible in real time by acquiring a series of short and long integration times with a DFPA. The THDR technique leverages the DFPA architecture to achieve either staring or scanning imagery with simultaneous linear response and high dynamic range. The basis of the THDR technique for staring systems is summarized below.

The number of counter rollovers can be calculated by rounding the ratio $N_{triggers}/2^m$ down to the nearest integer (the floor operation). The number of rollovers that have occurred during an integration period are not recorded by the DFPA device when only a single image is recorded of a scene. The information is lost and the transfer function of the resulting image may contain ambiguous information if the scene dynamic range exceeds the dynamic range of the counters, i.e., $2^m$ or more counts. The THDR technique provides a way of recovering potentially lost information due to rollovers by extending the dynamic range of the sensor.

To accomplish THDR, two or more images are collected and processed in sequence. At least one image has a short integration period ($T_S$), resulting in a low dynamic range image ($I_S$). The short integration period is chosen so that zero rollovers are expected. The second image has a long integration period ($T_L$), resulting in an image with ambiguous transfer function characteristics ($I_L$). Since there are no ambiguities within $I_S$, it can be used to predict the number of rollovers in $I_L$. The true transfer function of $I_L$ can then be calculated as described below and illustrated in FIG. 2.

Figure 2:
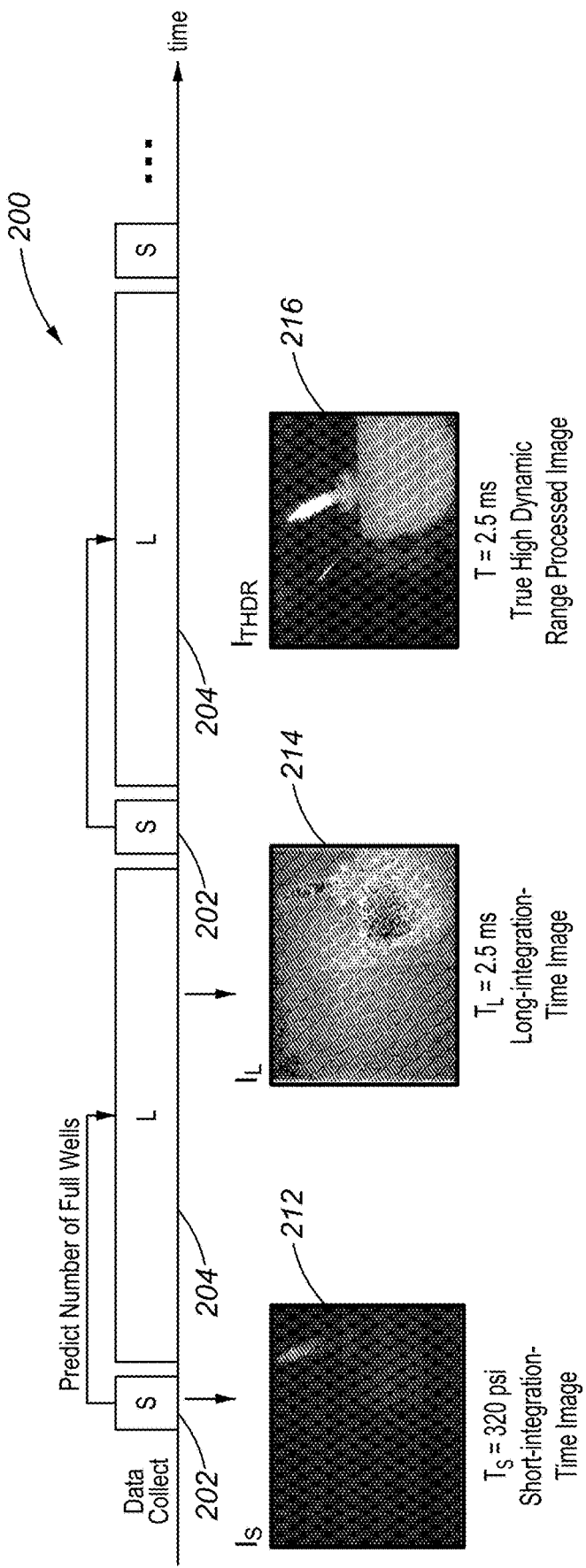
FIG. 2 illustrates a THDR process for a single detector element.

FIG. 2 illustrates a basic THDR imaging process for a single detector element. This basic THDR process includes acquiring images over a series 200 of alternating short integration periods 202 and long integration periods 204 with the DFPA 100 shown in FIGS. 1A and 1B or another suitable imaging array. In the case shown in FIG. 2, the short integration period is approximately 320 μs and the long integration period is approximately 2.5 ms. Other short and long integration periods also possible. Generally speaking, the duration of the short integration period is chosen so that none of the counters are expected to roll over, and the duration of the long integration period is chosen based on the desired signal-to-noise ratio and may be long enough that at least one counter rolls over. In some cases, the long integration period may be selected to be a certain multiple of the short integration period.

The long and short integration periods may also be selected to support video rate imaging. At video rates of 60 Hz or greater, the processing is effectively real time, and the lag between successive sets of short and long integration periods should be 16 ms or less. The maximum frame rate is given by $1/(T_S+T_L+2T_r)$, where $T_r$ is the time required to read out a frame from the DFPA, estimated to be about 150 microseconds for a 640 pixel×480 pixel DFPA. This frame rate is considerably higher than other approaches for high dynamic range imaging and is fast enough to support video frame rates of 60 Hz or more.

During each short integration period 202, the DFPA 100 acquires a low-intensity image 212. And during each long integration period 204, the DFPA 100 acquires a high-intensity image 214. Neither the DFPA 100 nor the processor 140 records the number of counter rollovers that have occurred during a particular integration period when only a single image is recorded of a scene, resulting in potential information loss. If the dynamic range of the scene exceeds the dynamic range of the counters ($2^m-1$ counts), then the resulting image may include one or more pixels corresponding to counters that have rolled over at least one or more times than neighboring pixels, as indicated by dark spots in the middle of the high-signal regions in the lower right quadrant of image 214.

To account for this information loss, the processor 140 estimates the number of counter rollovers based on the count(s) recorded during one or more short integration periods 202 and the ratio of the lengths of the short integration period 202 and the long integration period 204. Specifically, a linear count rate ($C_R$) is assumed for each pixel for a given scene and is estimated based on the signal ($I_S$) acquired over the short integration time ($T_S$):

$$C_R(T_S)=I_S/T_S$$

Next, this count rate is used to predict the number of counts for the same scene at the long integration time ($T_L$) by multiplying the estimated pixel count rate by the long integration time.

$$\text{Predicted counts } (T_L)=C_R \times T_L=I_S*T_L/T_S$$

The processor 140 divides the predicted number of counts at the long integration time by the native digital well depth, $2^m$ and rounded down (e.g., using a floor operation). This value represents the estimated number of full digital wells (FW) at the long integration time ($T_L$):

$$FW\ (T_L)=\text{floor}(CR \times T_L/2^m)$$

The processor 140 multiplies the number of full digital wells by the native digital well depth to produce the most significant bits (MSBs) of the true signal estimate. The processor 140 adds the number of counts collected at the long integration time to the most significant bits of the estimate of the true signal:

$$\text{Estimated True Signal } (T_L)=\text{floor}(CR \times T_L/2^m) \times 2^m + I_L$$

There are numerous variations on specific implementation. The true signal can be estimated by implementing the multiplication, division, and addition described above in real-time (e.g., using the processor 140) and/or in post processing, such as on a field-programmable gate array (FPGA) or other suitable processing device.

FIG. 2 also shows a true high dynamic range image 216 generated from a first image 212 acquired during a short integration period 202 and a second image 214 acquired during a long integration period 204. In this case, the short integration period 202 had a duration $T_S$=320 microseconds and the long integration period 204 had a duration $T_L$=2.5 milliseconds, and images were acquired with a 640×480 long-wave infrared DFPA. The scene includes a soldering iron at an estimated temperature of about 340° C., a cup at an estimated temperature of about 90° C., and a bottle at an estimated temperature of about 15° C. No rollovers can be seen in the short integration time image 212. Rollovers appearing as dark regions can be seen in the long integration time image 214. No rollovers appear in the THDR image 216.

For more information on THDR imaging in staring systems, see, e.g., U.S. application Ser. No. 14/261,840, "Methods and Apparatus for True High Dynamic Range Imaging," which was filed Apr. 25, 2014, was published as U.S. Pre-Grant Publication No. 2015/0036005, and is incorporated herein by reference in its entirety.

THDR for TDI and Other Scanning Imagery

THDR techniques can also be used to extend dynamic range when acquiring images using a scanning sensor, including when imaging in a scanning TDI mode using a DFPA image sensor. As in the staring mode case, two or more integration periods are used to calculate the number of rollovers in the image and correct it. Each individual TDI stage is a unique integration period when scanning. The first TDI stage, with integration period $T_S$, is non-destructively readout from the array and the image data ($IMG_S$) is stored in a memory (e.g., memory 150 in FIG. 1B). Following the last integration period along the scan, $T_L$, the THDR correction can be applied on a pixel-by-pixel basis in the final image data ($IMG_L$) to correct rollovers.

Figure 3:
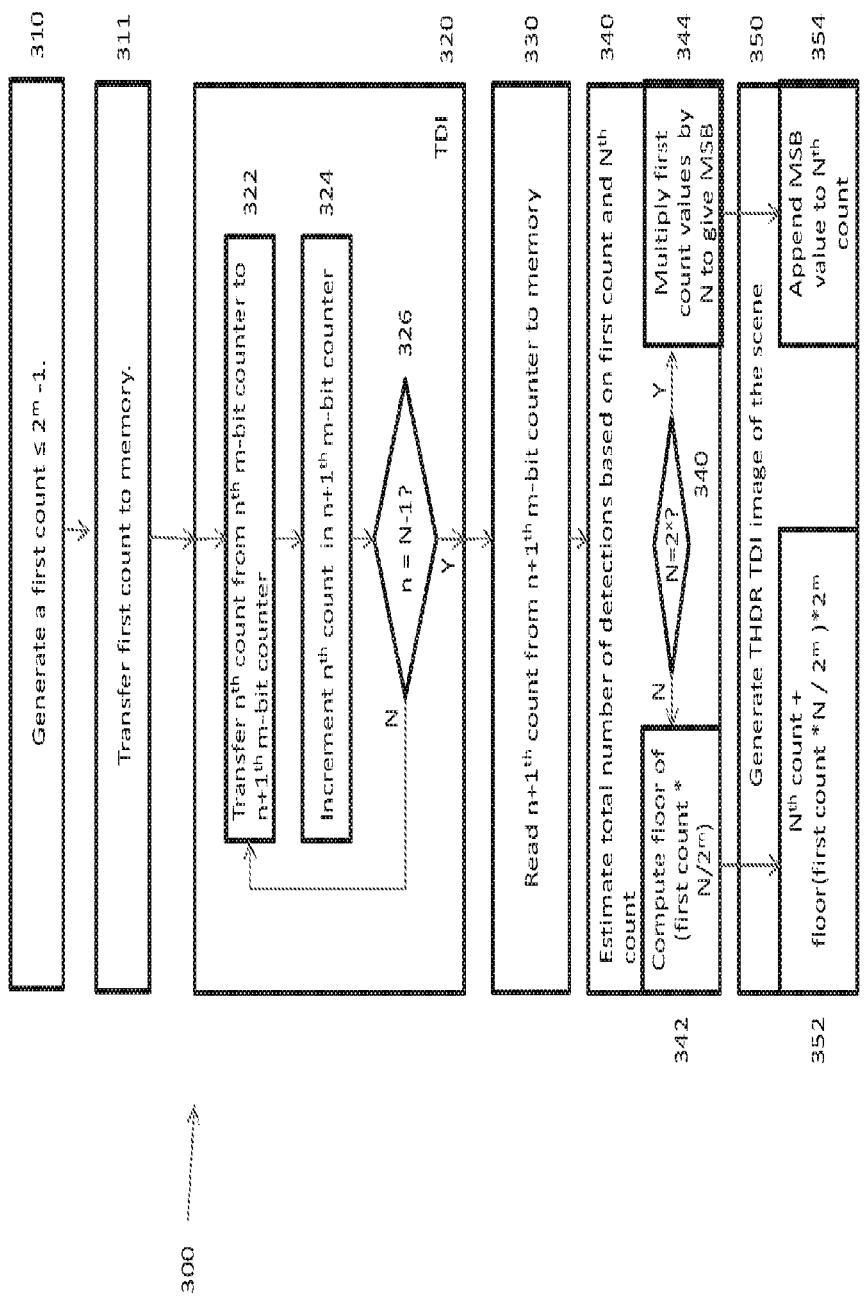
FIG. 3 is a flow diagram illustrating a THDR TDI process that can be implemented using the system shown in FIGS. 1A and 1B.
Figure 4D:
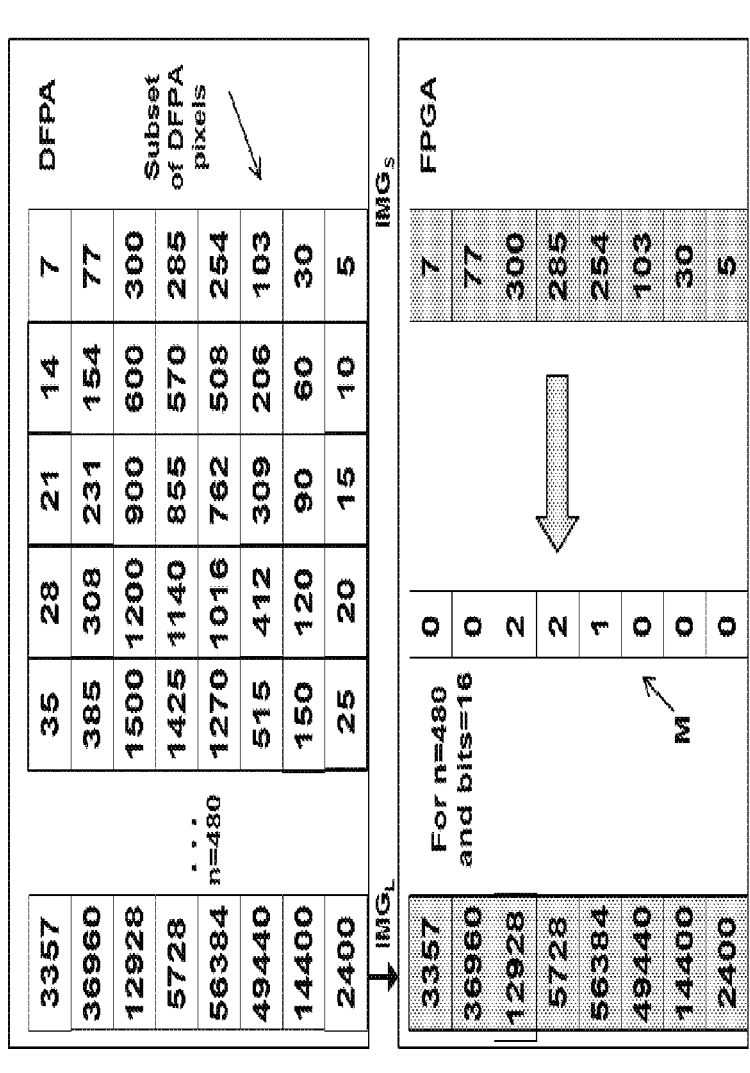
Figure 5A:
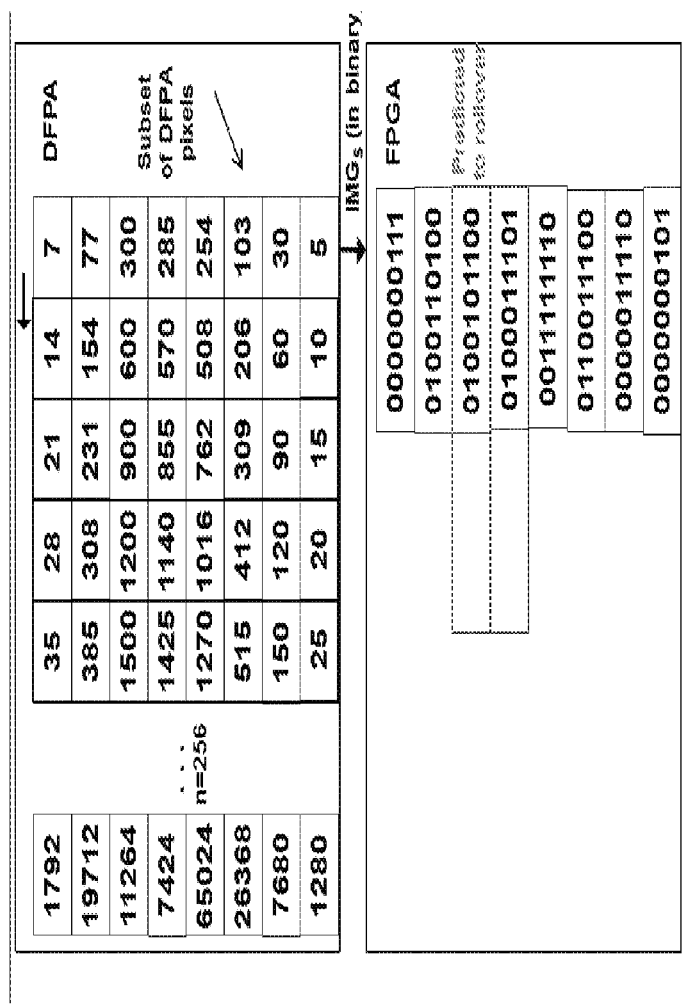
FIGS. 5A and 5B illustrate a computationally efficient TDI TDHR process for TDI integrated over $2^x$ stages, where x is a positive integer.
Figure 5B:
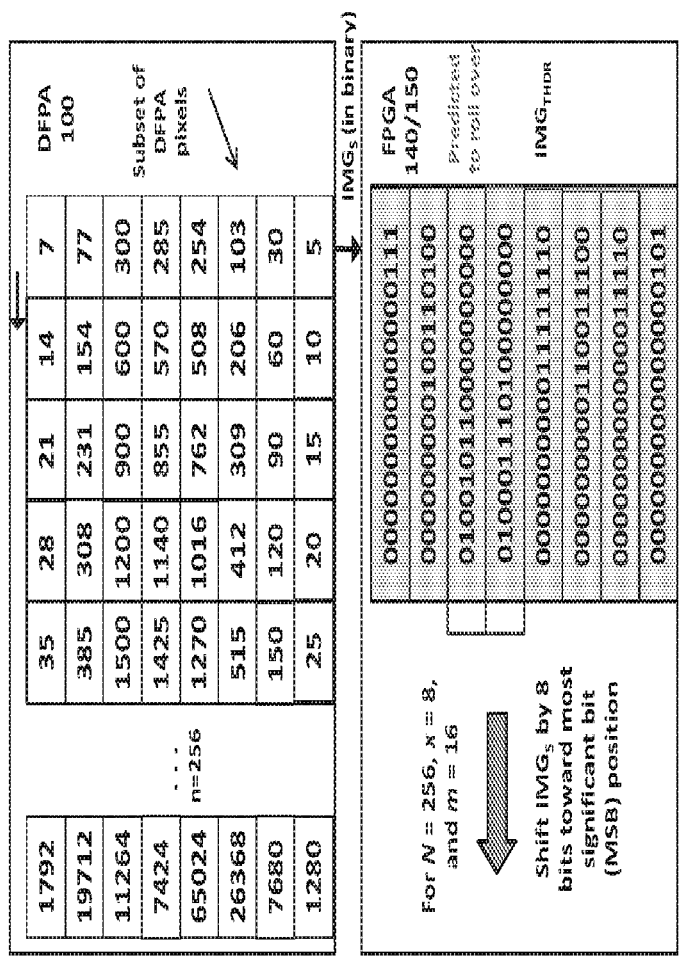

FIGS. 3-5 illustrate different aspects and versions of the THDR TDI process using a DFPA. FIG. 3 is a flowchart that shows an overall process 300 for accumulating, transferring, and processing counts with the DFPA and an FPGA or other processor coupled to the DFPA. FIGS. 4A-4E show different steps in the process 300. And FIGS. 5A and 5B show a computationally efficient process for generating THDR TDI images when the total number of TDI stages is a power of two.

The process in FIG. 3 includes generating a first count in one or more m-bit counters in the DFPA (step 310; FIG. 4A). These counts are generated by detecting photons with the corresponding detector elements during an integration period selected such that the counters don't roll over, i.e., such that each of the first counts is less than or equal to $2^m-1$. This integration period may be the first of the integration periods during generation of the raw (uncorrected) TDI image, or another integration period during generation of the raw TDI image, or an integration period that occurs before or after generation of the raw TDI image. In some cases, step 310 is repeated at every integration period during generation of the raw TDI image.

The system non-destructively reads or copies at least one of the counts generated during this first integration from the corresponding counter(s) to the FPGA memory or on-chip memory for use in calculating the number of rollovers during the total TDI scanning/integration period (FIG. 4A). It may read a single count, multiple counts, or the entire image from the DFPA.

The DFPA generates the raw TDI image in step 320 (FIGS. 4B and 4C). In the process 300 shown in FIG. 3, the first integration period in step 310 is the first integration period in the TDI image scan, so the counts are transferred among counters in the DFPA in step 322 (FIG. 4B). For instance, the DFPA may shift counts one column to the left as in FIG. 4B. Note that the transfer does not have be columnwise; it could be left, right, up, or down using inter-pixel transfer circuitry in the DFPA. In addition, the transfer direction may change with every transfer, e.g., to accommodate changes in relative velocity between the imaging system and whatever is being imaged. The counts are incremented in step 324 (FIG. 4C) during the next integration period in the TDI image scan. If there are more integration periods left in the TDI image generation (e.g., in step 340, the counts have been transferred through all N columns of the DFPA), the counts are transferred and integrated again. This repeats until the counts have been transferred all the way across the DFPA. Each of the integration periods may be the same, but there are enough integration periods that the sum of the integration periods is long enough that at least one counter rolls over during generation of the raw TDI image.

The raw TDI image is read off the DFPA to a memory in step 330 (FIG. 4D). The memory could be on-chip (e.g., on the DROIC) or off-chip (e.g., on an FPGA). In step 340, a processor (e.g., an FPGA) uses the raw TDI image and the first count(s) to estimate the number of rollovers (the middle column in the FPGA in FIG. 4D). Generally, the processor estimates the number of rollovers as:

$$M = \text{floor}[(IMG_s \times N)/2^m]$$

where floor is the floor operation that rounds the quantity in parentheses down to the nearest integer, $IMG_s$ represents the first count, N represents the number of integration periods (TDI integration stages/columns), and $2^m$ is the maximum possible count (step 342). The processor uses the number of rollovers to generate a THDR TDI image of the scene in step 350 (FIG. 4E). Generally (step 352), the processor calculates the THDR TDI image as:

$$IMG_{THDR} = IMG_s + (M \times 2^m).$$

THDR TDI for $2^x$ TDI Stages

If N is a power of two (i.e., if $N=2^x$, where x is a positive integer) (step 340), then the processor (e.g., FPGA) may estimate the number of rollovers and the THDR TDI image using a more computationally efficient technique illustrated in FIGS. 5A and 5B. In step 344, the processor multiplies the $IMG_S$ values (FIG. 5A) by N to yield the most significant bit (MSB) values. And in step 354 (FIG. 5B), the processor adds or appends the $IMG_L$ values to the MSB values to produce $IMG_{THDR}$. Alternatively, for any counter that is predicted to roll over after N stages of integration, the processor multiplies the corresponding $IMG_S$ column values by N:

$$IMG_{THDR} = IMG_s \times 2^x = IMG_s \times N$$

For $IMG_S=300$ (or 100101100 in binary), N=256, x=8, and m=16:

$$IMG_{THDR} = 100101100 \times 2^8$$

Again, the processor can perform this multiplication efficiently by bit-shifting the value of $IMG_S$ stored in binary counters as shown in FIGS. 5A and 5B.

As noted briefly above, the system can also perform array-wide TDI THDR imaging. In this case, $IMG_S$ is shifted to the memory after every TDI stage (integration period). The TDI THDR process, as described above, can be repeated for every $IMG_S$ by storing all $IMG_S$ data in the memory. For example, for N stages of TDI, N−1 sets of $IMG_S$ can be stored in the memory and can be used individually or in combination to correct the N-stage TDI image $IMG_L$.

In some cases, it may be appropriate to calibrate the gain and offset of the data prior to applying the THDR correction algorithm. The offset may be due to detector dark current, which can vary among detector elements in the array. Gain variation may be due to one or more of variations in detector quantum efficiency, variations in the analog-to-digital converter LSB size of the DROIC, and variations in gain of the DROIC pixels (e.g., from a current mirror). Each gain and offset is measured for each pixel in the $IMG_S$ and $IMG_L$ images. The $IMG_S$ values correspond to the gain and offset of the first column of pixels in the TDI array. The $IMG_L$ values correspond to the average gain and offset over the remaining columns of the TDI array.

Demonstration Data

Figure 6A:
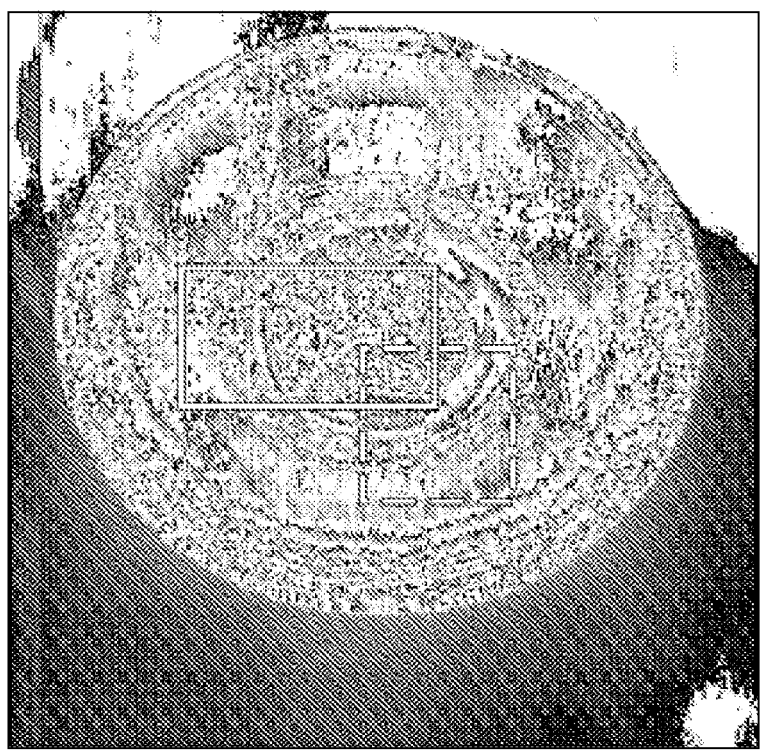
FIG. 6A shows a light bulb and lamp imaged with conventional DFPA TDI imaging.

FIG. 6A shows a light bulb in a lamp whose image is projected on the DFPA by a fast scanning mirror. Black spots in the center of the picture indicate counters that have rolled over. A TDI scanning approach is used in which the scan mirror is synchronized to shift the image on the array after the completion of each integration stage. In this example, a 1280×480 short wave band infrared imager was used. The TDI scanning was performed in the smaller dimension of the array—480 TDI stages were used, each having an integration time of 33 microseconds. FIG. 6B shows hexadecimal counts acquired by a DFPA for a subset of the raw, uncorrected TDI image after the final integration stage. There are many rollovers and the image is nearly indiscernible.

Figure 7A:
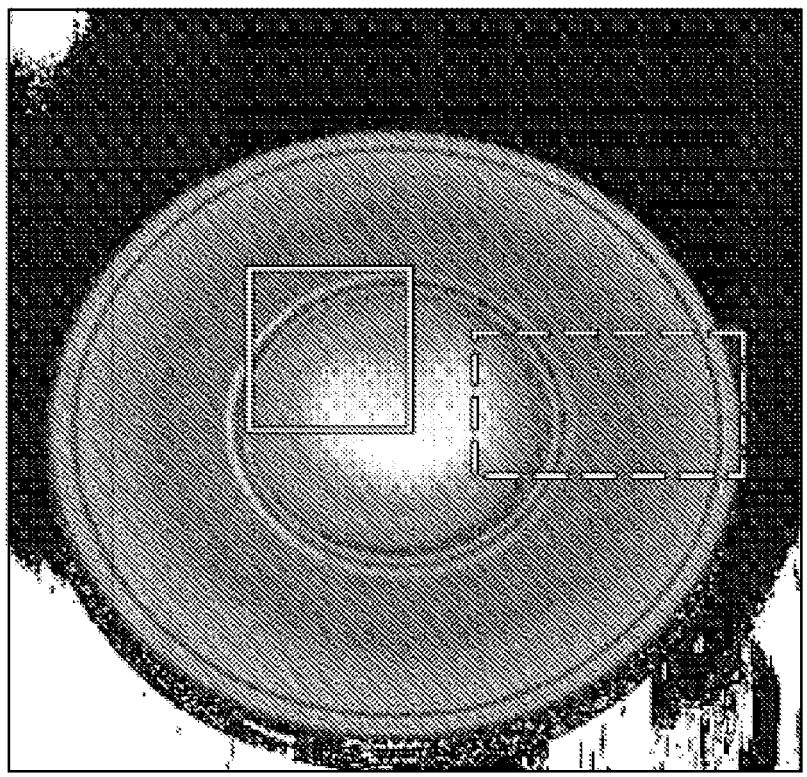
FIG. 7A shows light bulb and lamp imaged with THDR TDI imaging.
Figure 7B:
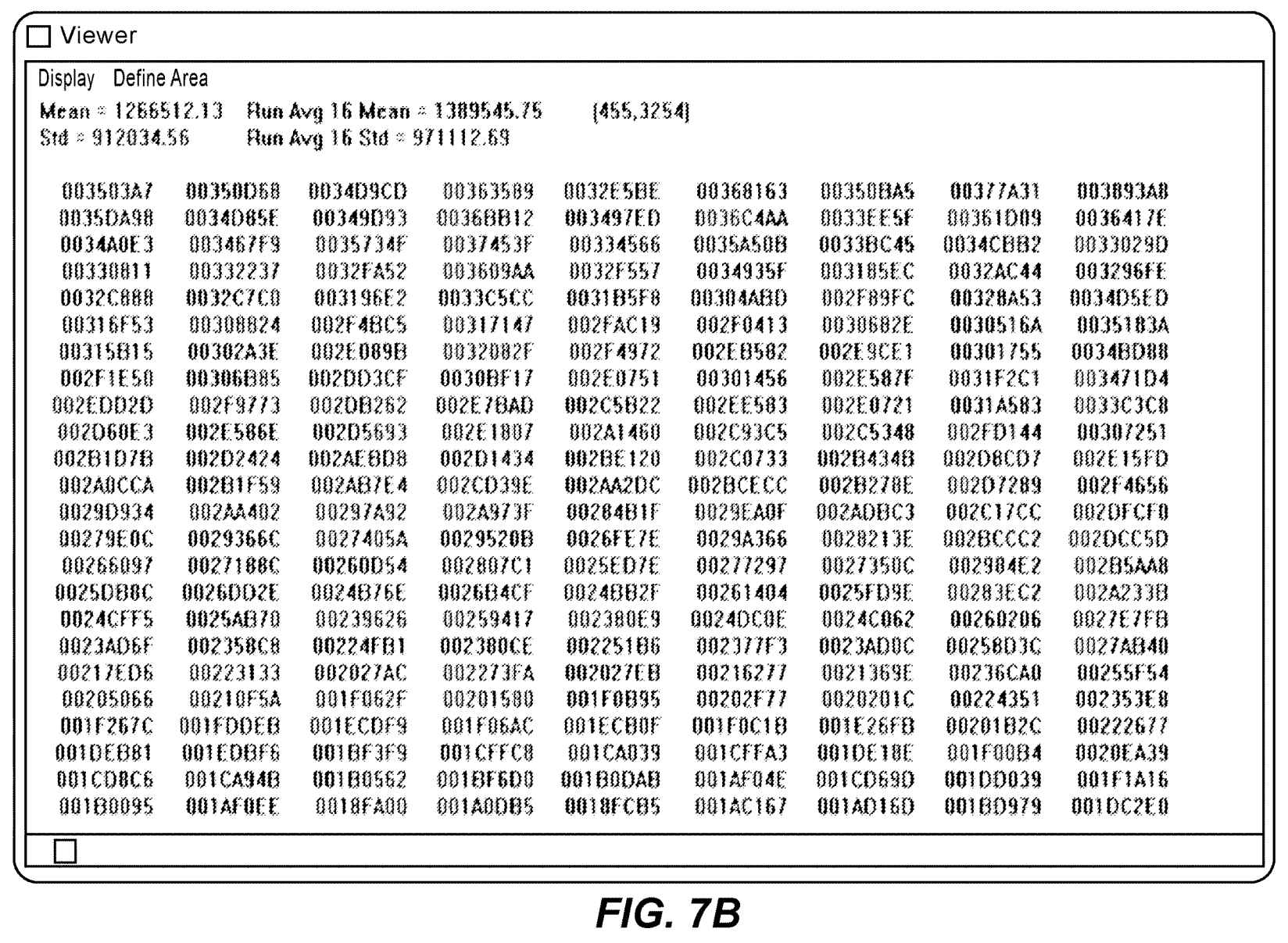

FIG. 7A shows the light bulb and lamp image after TDI scanning of FIG. 6A with THDR correction applied. FIG. 7B shows the hexadecimal counts of FIG. 6B for the same subset of the image in which the THDR correction has been applied. Unlike the uncorrected TDI image in FIG. 6A, the center of THDR TDI image in FIG. 7A is not mottled by rolled-over counts.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the technology disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of estimating a total number of detections by a detector element in a detector array comprising at least N detector elements and a counter array comprising at least N m-bit counters, each detector element in the detector array operably coupled to a corresponding m-bit counter in the counter array, the method comprising:
    generating a time-delay-and-integrate (TDI) image with the detector array and the counter array over N integration periods;
    non-destructively reading a count value from an m-bit counter during at least one integration period in the N integration periods; and
    estimating a total number of detections by an $N^{th}$ detector element in the detector array during the N detection periods based at least in part on the TDI image and the count value, where N and m are positive integers.

2. The method of claim 1, wherein non-destructively reading the count value from the m-bit counter comprises:
    non-destructively reading the count value at the end of the $N-1^{th}$ integration period in the N integration periods.

3. The method of claim 1, wherein generating the TDI image comprises:
    at the end of a first integration period in the N integration periods, transferring a first count value from a first m-bit counter in the counter array to a second m-bit counter in the counter array; and
    incrementing, by the second m-bit counter, the first count value to form a second count value in response to detections by a detector element in the detector array during a second integration period in the N integration periods.

4. The method of claim 3, wherein non-destructively reading the count value from the m-bit counter comprises:
    non-destructively reading the second count value from the second m-bit counter at the end of the second integration period.

5. The method of claim 1, further comprising:
    generating, in a first m-bit counter in the counter array, a first count value of less than or equal to $2^m-1$, the first count value representing detections by a detector element in the detector array during a first integration period in the N integration periods; and
    non-destructively reading the first count value from the first m-bit counter to a memory.

6. The method of claim 5, wherein estimating the total number of detections by the $N^{th}$ detector element is based at least in part on the first count value.

7. The method of claim 1, further comprising:
    calibrating the TDI image for an offset due to detector dark current.

8. The method of claim 1, further comprising:
    calibrating the TDI image for gain variations.

9. The method of claim 1, further comprising:
    calibrating the TDI image for variations in quantum efficiency among detector elements in the detector array.

* * * * *